US008831078B2

(12) United States Patent
Alliot et al.

(10) Patent No.: US 8,831,078 B2
(45) Date of Patent: Sep. 9, 2014

(54) METHOD AND DEVICE FOR IDENTIFYING AT LEAST ONE COMMUNICATION CHANNEL WITH AN INCIDENT SIGNAL

(75) Inventors: Eric Alliot, Mouans Sartoux (FR); Mark Wallis, Mouans Sartoux (FR); Issam Toufik, Juan-les-Pins (FR)

(73) Assignee: Ericsson Modems SA, Le Grand-Saconnex (CH)

( * ) Notice: Subject to any disclaimer, the term of this patent is extended or adjusted under 35 U.S.C. 154(b) by 63 days.

(21) Appl. No.: 13/514,338

(22) PCT Filed: Dec. 1, 2010

(86) PCT No.: PCT/EP2010/068634
§ 371 (c)(1),
(2), (4) Date: Jun. 7, 2012

(87) PCT Pub. No.: WO2011/069867
PCT Pub. Date: Jun. 16, 2011

(65) Prior Publication Data
US 2012/0236919 A1    Sep. 20, 2012

(30) Foreign Application Priority Data
Dec. 8, 2009    (EP) ..................... 09306193

(51) Int. Cl.
*H04B 3/46*        (2006.01)
*H04W 24/00*    (2009.01)
*H04W 72/00*    (2009.01)
*H04W 72/02*    (2009.01)
*H04J 11/00*      (2006.01)

(52) U.S. Cl.
CPC .............. *H04W 24/00* (2013.01); *H04W 72/00* (2013.01); *H04W 72/02* (2013.01); *H04J 11/0069* (2013.01); *H04B 2201/70702* (2013.01)
USPC ........... 375/224; 370/203; 375/316; 375/347; 375/350

(58) Field of Classification Search
None
See application file for complete search history.

(56) References Cited

FOREIGN PATENT DOCUMENTS

| EP | 0 892 528 A2 | 1/1999 |
| WO | 03/063538 A1 | 7/2003 |
| WO | 2007/103991 A2 | 9/2007 |
| WO | 2009/039211 A1 | 3/2009 |
| WO | 2009/077421 A1 | 6/2009 |

OTHER PUBLICATIONS

International Search Report issued in corresponding International application No. PCT/EP2010/068634, mailing date Mar. 1, 2011.

*Primary Examiner* — Adolf Dsouza
(74) *Attorney, Agent, or Firm* — Patent Portfolio Builders PLLC

(57) ABSTRACT

Method for identifying within an incident signal at least one frequency communication channel, the incident signal being received on a wireless apparatus, comprising determining a power spectral density (PSD) of that incident signal and identifying the at least one channel from the PSD. The PSD determination comprises storing temporal samples of the incident signal received during a predetermined duration and performing a first Discrete Fourier Transform (DFT) processing on the stored samples.

3 Claims, 5 Drawing Sheets

METHOD AND DEVICE FOR IDENTIFYING AT LEAST ONE COMMUNICATION CHANNEL WITH AN INCIDENT SIGNAL

The invention relates to a digital signal processing and more particularly to a process for searching and/or selecting a channel of frequency corresponding to a communication cell on which a mobile phone will synchronize.

A non-limitative application of the invention is directed to the wireless communication field, in particular the 2G, 3G and 4G standards.

Before synchronization with a cell, and to anticipate any handover to another cell, a scan of the downlink band is necessary to pre-select channels. In the state of the art, the local oscillator frequency of the mobile phone is controlled by fine frequency steps (for example 400 kHz) to scan the entire downlink band. After the scan, a test of synchronization is realized on every channels pre-selected. The cumulated process named PLMN search is long and its precision can be improved.

After the selection, the frequency of the local oscillator must be corrected to the exact frequency of the selected channel. In the state of the art, a stage named HFO correction is dedicated to such a purpose. This process is similar to the previous one: in a first step the downlink band is scanned, a channel is selected and then a synchronization test is realized. This process is not exact, particularly when the correction needed exceeds a certain range (for example more than 20 kHz). Its length and precision can also be improved.

These two processes are realized by hardware processing means, and they require the radio receiver to be turned on. However, as long as the mobile phone is not synchronized with any cell, the radio is useless for any other purpose. The radio receiver being the biggest consumer of energy in a mobile phone, this yields to a loss of autonomy.

According to an embodiment, a method for identifying at least one communication channel in the received signal is based on storing the received signal, to avoid this loss of autonomy. The method is also based on the use of a firmware instead of hardware enabling the handling of the stored data, and an easy implementation of complex operations.

According to an aspect, it is proposed a method for identifying within an incident signal at least one frequency communication channel, said incident signal being received on a wireless apparatus, comprising determining a power spectral density (PSD) of that incident signal and identifying said at least one channel from said PSD.

According to a general feature of this aspect, the PSD determination comprises storing temporal samples of said incident signal received during a predetermined duration and performing a first Discrete Fourier Transform (DFT) processing on said stored samples (as an example of implemented DFT, Fast Fourier Transform can be used).

The use of DFT enables a faster and more accurate PSD determination. This better precision can be useful in the further steps enabling PLMN search and HFO to be realized faster.

The process on stored signal permits the shut down of radio receiver, thus it can enable an improved autonomy. It can also enable in case where different modes (2G, 3G, 4G mode) are used simultaneously the realization of the task of the other modes on the radio receiver.

In an embodiment, the identifying step concerns one frequency communication channel and comprises:
  determining the strongest frequency peak in the PSD,
  performing a second DFT processing on the stored temporal samples corresponding to a frequency band around the strongest frequency peak, the resolution of the second DFT processing being higher than the first DFT processing.
  determining the center frequency of said frequency channel from the result of the second DFT processing.

In another embodiment, the identifying step concerns all frequency communication channels and comprises performing a frequency derivative of said PSD and determining the extremums of said derivative PSD.

According to an another aspect, it is proposed a device for identifying within an incident signal at least one frequency communication channel, comprising reception means for receiving samples of the received signal, and processing means including:
  means for determining a power spectral density (PSD) of that incident signal
  identification means for identifying said at least one channel from said PSD.

According to a general feature of this aspect, the processing means further comprises:
  storing means for storing temporal samples of said incident signal received during a predetermined duration
  a DFT module for a Discrete Fourier Transform processing.

In an embodiment, the processing means comprises spectrum analyzing means configured to determine the strongest frequency peak in the PSD, and
  the DFT module is configured for processing a second DFT processing of the said temporal samples corresponding to a frequency band around the strongest peak with a resolution higher than the first DFT processing, and
  the processing means are configured to further determine the center frequency of the said frequency channel from the result of the second DFT processing.

In another embodiment, the processing means comprises spectrum analyzing means including:
  derivative means for determining the derivative frequency of said PSD
  determination means for determining the extremums of said derivative PSD.

Other advantages and features of the invention will appear on examining the detailed description of embodiments, these being in no way limiting, and of the appended drawings, in which:

FIG. 1 illustrates the layer 1 means, referenced 2, of a device enabling the synchronization of a mobile phone according to the state of the art in the 3G standard;

Figure 1:
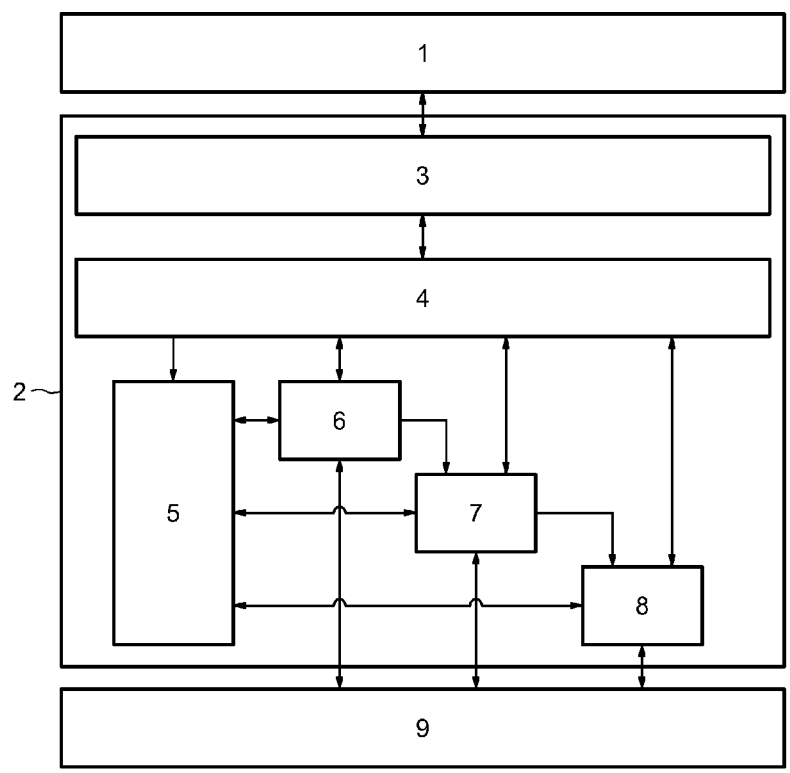
FIG. 1 illustrates the level 1 of a device enabling the synchronization of a mobile phone according to the state of the art.

Such a device comprises a message handler 3, and controls means 4. The message handler is configured to receive and process messages from the upper layers means 1. The control means then send orders accordingly to the other means 5-8 and control the realization of the orders by the other means 5-8.

The other means 5-8 comprise:

RSSI (Received Signal Strength Indication) measurement campaign means 6. These means enable the power evaluation of the spectrum of the downlink band by step of 200 kHz. After RSSI, a set of UARFCN (Universal Terrestrial Radio Access Absolute Radio Frequency Channel Number) candidates is selected. The HFO and IA (Initial Acquisition) described hereafter will be performed on the set of UARFCN candidates. As it is well known to the man of the art, the center frequency of the channels of the downlink spectrum are called UARFCN. They are predefined as a list of frequencies with a pitch of 200 kHz between two values. According to one implementation example, a pre-selection of nine UARFCN candidates within the list can be made according to the proximity with the center frequency of the selected channel.

HFO (High Frequency Offset) correction means 7. They enable to determine, on each candidate UARFCN, the difference with the frequency of local oscillator of the mobile. For each UARFCN candidate, the frequency of the local oscillator is then adjusted accordingly and synchronization is attempted by the IA (Initial Acquisition) means 8. The HFO is sensitive to high frequency offsets, the correction is supposed to be in the range [−11 kHz, +11 kHz].

Initial synchronization database 5, these means are configured to memorize the result of the means 6-8, and to enable the reading of the stored results and the stored parameters by the means 6-8.

The means 5-8 can be used subsequently and/or independently by the control means 4. Theses means can control the physical layer means 9 accordingly to the order from the control means 4.

All stages and means described above are part of the initial synchronization process means. They may be realized by software modules within a microprocessor of the mobile phone and/or by specific components within an integrated circuit of the mobile phone. They belong to level 1 layer means.

According to an aspect, the invention is directed to the physical layer means. They will be described more in detail in the FIGS. 2-5. In FIGS. 3 and 5 the level 1 layer and upper layer means are represented by the control means 350 and 550 respectively.

The physical layer means may be realized by firmware or software modules within the microprocessor of the mobile phone and/or by specific components within an integrated circuit of the mobile phone.

Before describing FIGS. 2-5, the method according to the layer 1 is now described shortly.

Before synchronization of a mobile phone, a correction of local oscillator is necessary and comprises:

a RSSI an IA test with HFO on a pre-selected UARFCN candidates (Universal Terrestrial Radio Access Absolute Radio Frequency Channel Number) corresponding to the center frequency of the channel selected. For example, nine UARFCN candidates can be pre-selected.

IA test comprises a test of synchronization on the pre-selected UARFCN candidates to select one UARFCN. Actually, the pre-selected UARFCN are tested until an IA test with one UARFCN is positive.

The main constraint on the correction of the local oscillator is the accuracy of RSSI. Because, as stated before, the HFO correction is sensitive to high frequency offset and if the RSSI is not accurate, the HFO cannot be realized. Moreover, with a more accurate RSSI, after the HFO correction the IA test will be successful with fewer tests on the pre-selected UARFCN candidates.

In the state of the art, another stage related with synchronization on a cell is important: PLMN (Public Land Mobile Network) search. It permits a pre-selection of channels, each corresponding to a cell on which the mobile is susceptible to synchronize in a further process. The PLMN search comprises:

a RSSI, a selection of several channels, and an IA test on the pre-selected candidates UARFCN for each channel selected.

During the selection, six channels for example, can be selected. This selection can be based on the strongest channels.

During the PLMN search, the candidates UARFCN should be accurately pre-selected to enable the IA test to be successful with fewer synchronization attempts.

As it can be stated, the RSSI is used in the HFO correction and in the PLMN search. This step is important because the better its precision the fewer UARFCN to be tested and the faster the overall process is. As an example of implementation, the precision of the RSSI is 200 kHz. This precision is not sufficient.

The process of the RSSI is long: in case of 3G standards, where the downlink band is 60 MHz or 75 MHz there are from 300 to 375 shifts of 200 kHz to cover the entire band.

According to an embodiment of the invention, it is proposed a solution enabling a faster and a more precise spectrum measurement than the RSSI. The overall process is faster on two ways. The accuracy at the end of the process is also improved.

Two applications of the improved RSSI will be described hereafter in the case of PLMN and of HFO.

Figure 2:
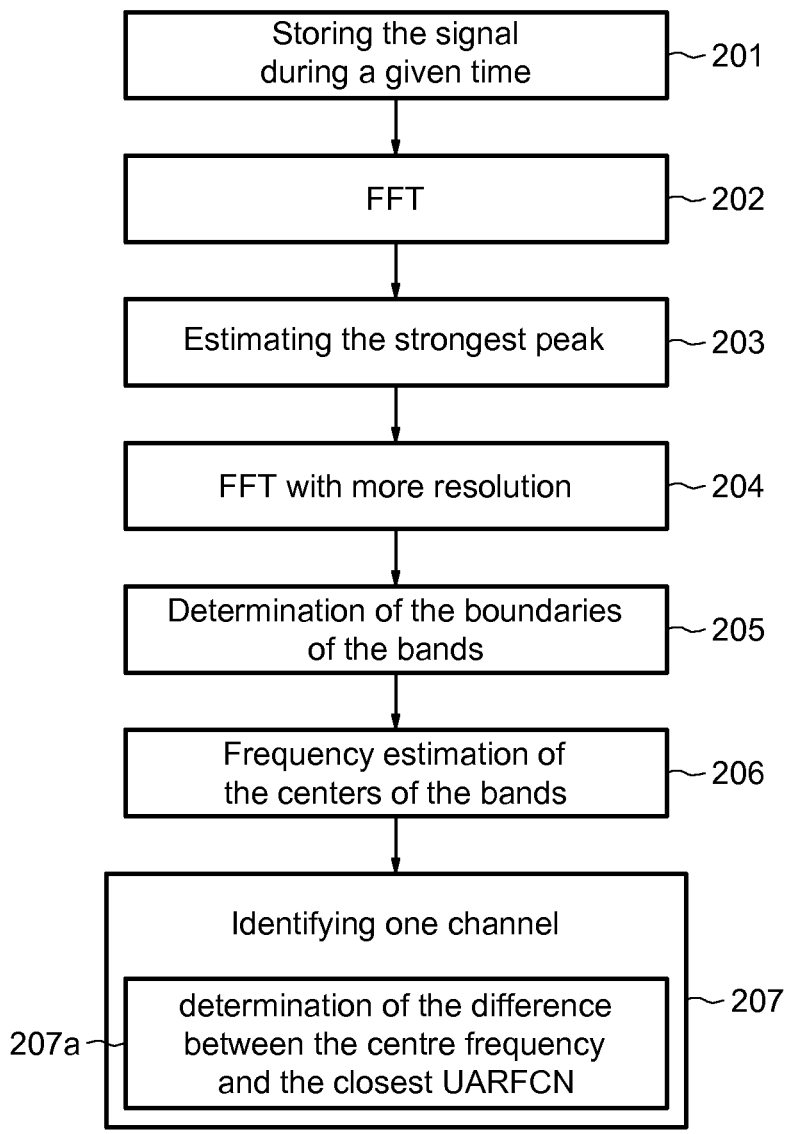
FIG. 2 illustrates diagrammatically a first embodiment of a method according to the invention.
Figure 3:
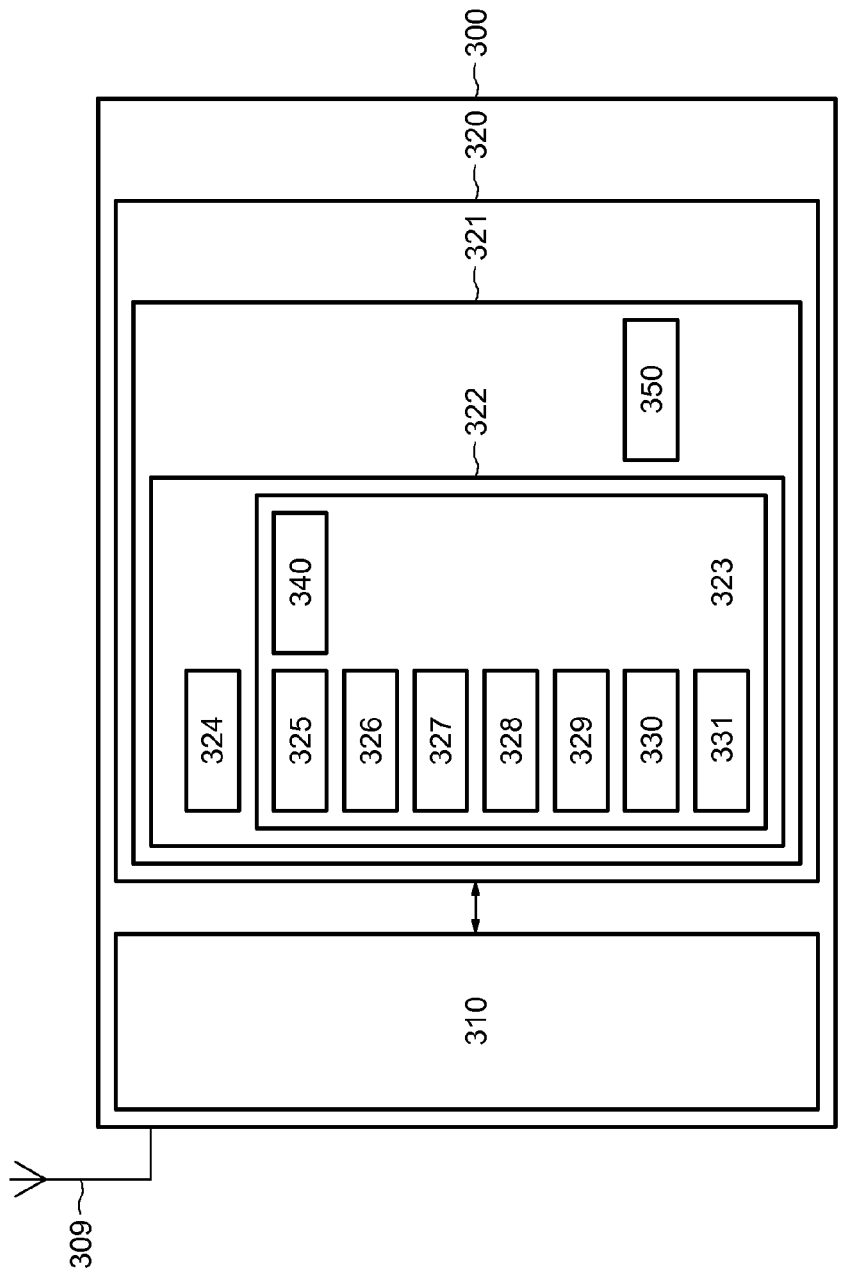
FIG. 3 illustrates diagrammatically a first embodiment of a wireless apparatus according to the invention including an embodiment of a device according to the invention.

FIG. 2 illustrates a flowchart where the high frequency offset (HFO) correction is improved. The HFO correction is operated to tune the local oscillator frequency into the center frequency of the strongest received channel.

First, in step 201, the module of the IQ signal is stored during a given number of slots. As it is well known to the man of ordinary skill, a frame contains slots. As an example, the IQ signal can be stored during 1 slots (in order to cumulate enough samples for the whole spectrum (256.[1/7680].15). (15/10)=0.75 slot are needed, the calculation will be explained hereafter).

As it is well known from the man of ordinary skill, the IQ signal corresponds to a signal with two modulation bearers: one said "in phase", and the other in quadrature with precedent one. This signal is therefore called IQ for in and quadrature.

The storing can be realized by different processes that can be applied to the IQ signal. First, the signal is RF (Radio Frequency) processed, this step comprises an analog demodulation. Then the analog signal is converted to numerical samples, and the numerical signal is filtered (in the 3G case a Root-Raised-Cosine filter is used). According to one embodiment, the numerical samples can be down-sampled and processed by a FIFO (First In First Out). When the FIFO is full, the samples can be stored in a DMA (Direct Memory Access). Whenever the stored samples are needed, the DMA fill the FIFO and the down-sampled samples can be up-sampled back using interpolation means.

Then, in step 202, the stored signal is DFT (Discrete Fourier Transform) processed. According to one embodiment, after a frequency shift (e.g. of 3.84 MHz) corresponding to the signal bandwidth, a first DFT is processed on the signal bandwidth. According to an example of realization, the granularity used is of 256 points for 7.68 MHz. Successive frequency shifts (e.g. of 3.84 MHz) corresponding to the signal bandwidth and DFT are reiterated until the whole downlink band is covered. As an example, in case of a band of 60 MHz and a signal bandwidth of 5 MHz, 15 frequency shifts and 16 first DFT are necessary to process the whole band. Then, all the DFT results are concatenated; it gives the PSD (Power Spectral Density) over the entire downlink band.

With the PSD of the data over the entire downlink band, the frequency corresponding to the channel with the strongest signal power can be determined 203 by spectrum analyzing means. Different well known methods can be used as absolute max peak detection or max correlation peak. Optionally, a dBm (decibel-milliwatt) conversion of the PSD is possible.

Then, a second DFT 204 with a better granularity (e.g. 1024 points for 3.84 MHz enabling a granularity of 3.84 MHz/1024=3.75 kHz) is applied on a frequency channel around the strongest peak.

In other words, as an example of realization, the DFT is processed on a 3.84 MHz band. To cover the whole spectrum the signal is shifted by k. 3.84 MHz and then DFT processed. These two steps are repeated from k=0 to k=16, The sixteen 3.84 MHz width spectrums are then concatenated to estimate the whole spectrum. One of the spectrums contains the strongest power signal, its corresponding shift is named FSK. The samples belonging to the DFT band 3.84 MHz after the FSK shift are the said temporal samples corresponding to the band around the strongest peak.

The second DFT can be applied on these samples after an up-sampling with interpolation; a quarter-chip sampling can be for example used.

With this better resolution band representation, a precise determination of two boundaries of the channel 205 is possible by spectrum analyzing means. Some methods based on derivative can be applied in this case and will be detailed hereafter.

The center frequency of the channel can be determined from these boundaries 206. Actually, the center is, either in the center between the two boundaries (Fdown, Fup), either if one is undeterminable 1.92 MHz (in case of 3.84 MHz is considered for the band of DFT and for the frequency shift) distant from the other. In other words, to determine the center, there are three possibilities:

(Fdown+Fup)/2 if both boundaries are available
Fdown+1.92 MHz if only boundary Fdown is available
Fup−1.92 MHz if only boundary Fup is available.

Accordingly, during the steps 205 and 206, the center frequency of the frequency channel is determined from the result of the second DFT The center value is then compared 207 to the UARFCN. During this comparison, the closest possible frequency and the difference delta between the center frequency and the closest UARFCN is determined, 207a, The local oscillator frequency of the mobile phone can be tuned with the determined delta value.

In other words, during the steps 203 to 207, one channel from said PSD estimated is identified.

Then, the further steps of the HFO can thus be processed on the real time signal.

In one embodiment, the HFO can be started after the method described from the band scan step with a tuned local oscillator frequency.

In another embodiment, with a tuned oscillator frequency the band scan can be skipped because a set of pre-selected UARFCN candidates closest to the UARFCN is determined at 207a.

Depending on the embodiment, the advantages of the method are:

In one case, corresponding to the said above another embodiment, the DFT processing with zoom (6 ms, 3.75 kHz) is faster and more precise than the RSSI (700 ms, 200 kHz).

In any case, with the first tuning and a better resolution, the remaining steps of local oscillator frequency correction will be easier and fewer UARFCN candidates will be tested. The overall process is therefore faster. Moreover, the shut down of the radio receiver can enable an improved autonomy. It can also enable better different modes cohabitation.

FIG. 3 illustrates diagrammatically a wireless apparatus 300 including a device 322 capable of implementing a method for identifying at least one frequency communication channel as described in FIG. 2. The apparatus comprises conventionally an antenna 309, an analog stage 310, a digital stage 320 and control means 350. The antenna 309 is able to emit and/or receive RF signals. The analog stage 310 comprises conventional means for RF processing.

The digital stage 320 includes, for example, a base-band processor 321. The device 322 comprises processing means 323 for comparing a center frequency of at least one channel of frequency with known UARFCN. The device further comprises filtering means 324 for RRC filtering the sample. The filtering means of the samples comprise also reception means for receiving the digital samples of the incident signal.

The device may be realized by firmware modules within the base-band processor. Using firmware, the reading of the signals stored and the said DFT zoom can be made through an easy implementation.

The processing means 323 includes:

storing means 325 for storing the signal, these means can comprise a FIFO and Direct Memory Access. They also can comprise means for down sampling and up sampling with interpolation for example.

a DFT (Discrete Fourier Transform) module 326 capable of working with at least two resolutions for example with a granularity of 256 points and 1024 points.

shifting means 327 configured to frequency shift the samples. They can be realized by a multiplication with a 3.84 MHz frequency shift.

concatenation means 328 for concatenating the bands, and control means 340 configured to control the means 326, 327 and 328.

The DFT module 326 works with the shifting means 327 and concatenation means 328. These three means are controlled by the control means 340 to realize the PSD of the whole downlink band. The means 326, 327, 328 and 340 are thus means for determining a power spectral density of the signal.

The processing means 323 also comprises spectrum analyzing means 329. These means can be realized by different well-known methods implementing device as absolute max peak detection or max correlation peak. The spectrum analyzing means are configured to determine the strongest peak among the spectrum of the whole downlink band. They further collaborate with the shifting means 327 to determine the frequency shift corresponding to the band with the strongest peak.

The DFT module is then configured to process these samples with a better resolution.

On this better resolution spectrum, the spectrum analyzing means 329 are further configured to determine the boundaries of the channel around the strongest peak.

The processing means comprise also calculation means 330 for determining the center of the channel, and comparison means 331 for comparing the center frequency with UARFCN.

In other words, the means 329-331 are identification means of one channel from said PSD.

The processing system and the means comprised within may be realized by software and/or firmware modules within the microprocessor and/or by specific components within an integrated circuit. All the physical layer means of device 323 are controlled by the control means 350.

Figure 4:
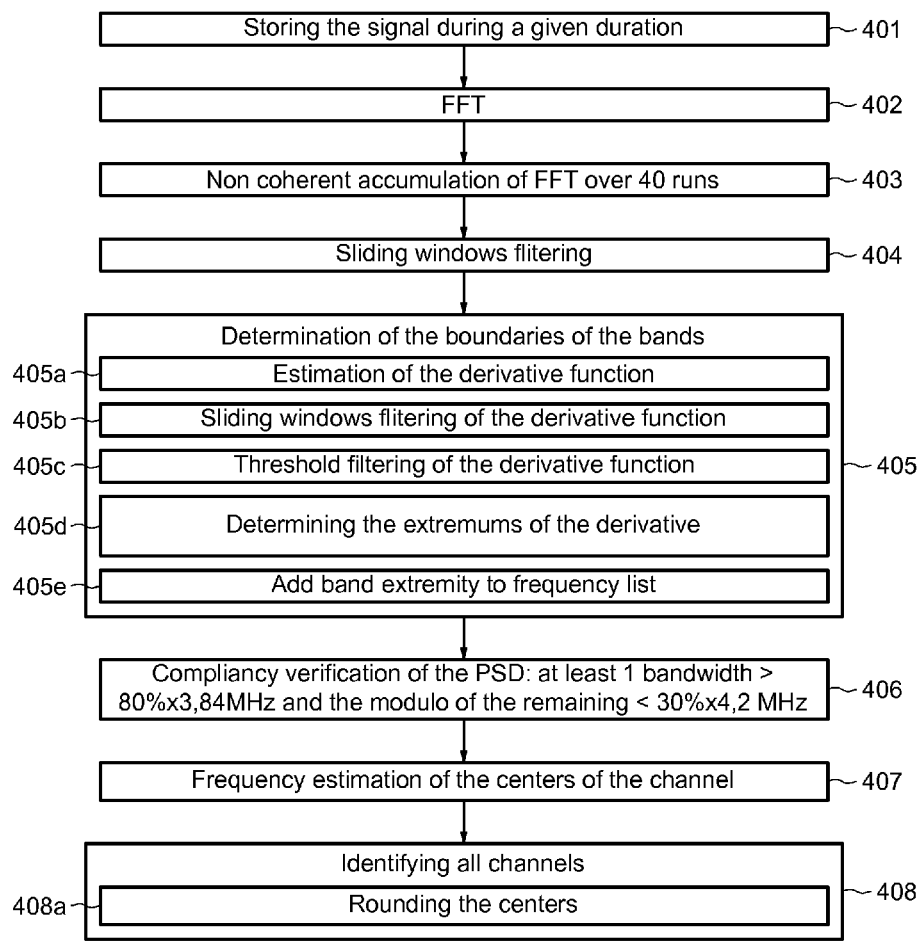
FIG. 4 illustrates another embodiment of a method according to the invention.
Figure 5:
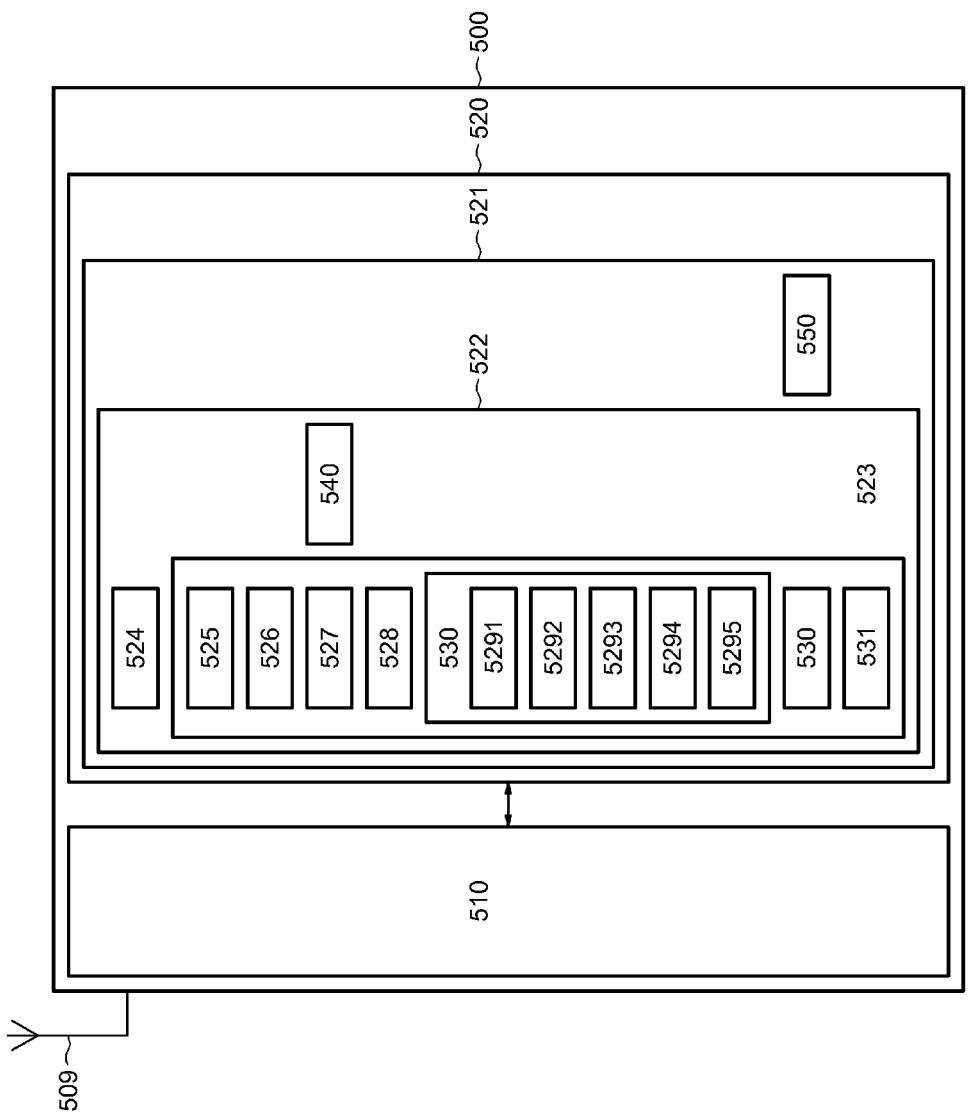
FIG. 5 illustrates another embodiment of a device according to the invention.

FIG. 4 illustrates another flowchart where the PLMN search is improved.

First, 401, as in the precedent flowchart, the IQ signal is stored during a given number of slots, for example 248, This number should be sufficient to enable a non-coherent accumulation, as it will be described hereafter. Then a DFT, 402, is processed on the whole signal with a granularity of 1024 points. The method used for these two steps can be, for example, similar to the precedently presented in steps 201 and 202 of the precedent embodiment.

Then, a non-coherent accumulation 403 of the PSD is processed. The non-coherent accumulation can be done for example on 40 PSD results. The non-coherent accumulation comprises a storing of all the maximum level of each frequency among the 40 PSD accumulated. The non-coherent accumulation enables to mitigate the fading and noise.

The necessitating time expressed in number of slots can be simply calculated:

In the case of 3G, each frame lasts 10 ms and contains 15 slots. Each slot contains 2560 chips. Therefore, the frequency of chip is 3840 kHz. As stated before, the sample are stored as half chip, the frequency of half chip is 7680 kHz.

With 15 the approximate number of frequency shifts and DFT to cover the whole band and in case of a 1024 points granularity DFT it leads to:

$$(1024.[1/7680].15).40.(15/10)=120 \text{ slots.}$$

An optional dBm conversion of the amplitude scaled PSD can then be processed at this stage.

In the step 404, a sliding windows filtering is processed to enable attenuation of the AWGN noise (Average White Gaussian Noise). The length of the sliding window can be 30, for example, with all coefficients set to 1.

Then, the further processes 405 are done on the derivative of the PSD accumulated and filtered to determine the beginning and the end of each channel.

First, the derivative function 405a of the PSD is estimated. For example, a method using the followed formula can be used:

$$(X_{n+30}-X_{n-30})/60 \text{ to determine the derivative value at position n.}$$

Then, 405b, to minimize the AWGN a sliding window filtering is applied. The length can be for example 10.

A filtering by threshold 405c is then applied on the PSD derivative function. For example, only the peaks with absolute amplitude higher than 35% of the maximum peak are kept.

This filtered derivative will then contain positive peaks corresponding to an up-step and negative peaks corresponding to down-steps.

Then, 405d, a recursive down-step and up-step detection, and channel band removal is done (each detected band is removed from the whole band to be processed for the next iteration). There is for example a limitation on six channels within one whole downlink band. In other words, in the derivative of the PSD a channel corresponds to an up-step followed by a down-step. The up-step and the down-step should be spaced by approximately 3.84 MHz. First, the up-step is detected. After the up-step detection, the up-step is suppressed and another up-step detection takes place. The same process is applied on the down-step. The results of the two processes are compared and taking into account the space of approximately 3.84 MHz, the channels are determined. When the boundaries of six channels are determined, the step 405d is finished.

The evaluated channel boundaries are then added 405e to the list of the boundaries.

The remaining steps 406-408 are processed on the PSD directly with the use of the boundaries values determined above.

First, the compliancy of the frequency channel bands determined is examined 406. In such a way, it is determined if the channels detected in the derivative are coherent with the result that can be expected from a PSD comprising different cells.

For each channel band, it is then determined the center frequency of the channel 407. The center is either in the middle between the two boundaries (Fdown, Fup), either if one is not available 1.92 MHz distant from the other. In other words, to determine the center there are three possibilities:

(Fdown+Fup)/2 if both are available
Fdown+1.92 MHz if only Fdown is available
Fup−1.92 MHz if only Fup is available.

Then, 408, each said center frequency is aligned with its closest center UARFCN. Further, a set comprising channels each corresponding to one center UARFCN can be determined. For example, this set comprises six channels. Then, for each of the channels of the set, a certain number, for example nine, pre-selected UARFCN candidates can be determined. The candidates can be, for example, pre-selected according to their distance to the center UARFCN of the channel considered.

The PLMN search is then continued from the IA test on the pre-selected UARFCN candidates for each of the channels selected on the real time signal. The pre-selected candidates can be tested, for example, from the left part of the band (lower UARFCN) to the right part of the band (higher UARFCN).

In other words, during the steps 403 to 408 all channels from said PSD have been identified.

In this application, the invention enables a faster process than the RSSI (700 ms). As a matter of fact, the DFT processing lasts approximately:

$$(1024.[1/7680].15)0.40=85.33 \text{ ms}$$

In this application, the better resolution (3.75 kHz) of the invention enables a more accurate UARFCN selection than the RSSI, therefore in the remaining process fewer UARFCN will be tested. The overall process is therefore faster on two ways.

Moreover, if not used, the shut down of the radio receiver can enable an improved autonomy. It can also enable better different modes cohabitation. In other words, as this method worked notably on stored data, when different modes (2G, 3G, 4G mode) are used simultaneously the implementation on one mode enable the realization of the tasks of the other modes is possible.

FIG. 5 illustrates diagrammatically a wireless apparatus 500 comprising an analog stage 510, a digital stage 520, control means 550 and eventually a base-band processor 521. The digital stage also includes a device 522 capable of implementing a method for identifying at least one frequency communication channel in the application for PLMN search. This device may be also incorporated in a software and/or firmware manner in the base-band processor 321 of the wireless apparatus of FIG. 3. The device 522 comprises processing means 523 for comparing a least one-center frequency with UARFCN. The device further comprises filtering means 524 for RRC filtering the sample and means for applying a sliding window on the sample. The length of the sliding window can be for example 30 with all coefficients set to 1, The filtering means of the sample further comprise reception means for receiving the digital samples of the incident signal.

The processing means 523 comprise means 525-531 similar to the ones described in FIG. 3. These means are:
storing means 525 for storing the samples
a DFT module 526 configured to process a DFT on for example a 3.84 MHz band with for example only one granularity (1024 points).
shifting means 527 configured to frequency shift the samples of for example 3.84 MHz.
concatenation means 528 for concatenating the bands of samples of for example 3.84 MHz width.
control means 540 configured to control the means 526, 527 and 528

The DFT module 526, the shifting means 527 and the concatenation means 528 are controlled by the control means 540 to cooperate to determine the PSD on the whole downlink band. The means 526-528, 540 are thus means for determining a power spectral density of the signal.

The processing means 523 further comprises spectrum analyzing means 529.

The spectrum analyzing means comprise:
non-coherent accumulation means 5291. They are configured to process a storing of all the maximum level of each frequency among the cycles accumulated.
derivative means 5292. They are configured to apply a derivative formula to the PSD, for example $(X_{n+3}-X_{n-30})/60$ is the derivative at position n.
filtering means 5293. These means are configured to apply filters to the derivative PSD estimated by the derivative means. They comprise a filter by threshold of PSD. With this filter, for example, only the peaks with amplitude higher than 35% of the maximum peak are kept. They also comprise a sliding window filter to minimize the noise. The length of window can be for example 10.
recursive up-step and down-step detection means 5294. They are configured to determine, after the filtering within the derivative of the PSD, up-step and down-step corresponding to boundaries of a channel band knowing that for one channel the boundaries should be spaced by approximately 3.84 MHz. They are also configured to detect a limited amount of up-step and down-step, for example for preselected number of channels. In other words, the recursive down-step and up-step detection means 5294 are determination means for determining the extremums of said derivative PSD.
compliancy checking means 5295. According to the boundaries determined by the means 5294, the channels in the PSD can be determined. Their compliancy is checked by the compliancy checking means 5295. In such a way, it is determined if the channels detected in the derivative are coherent with the result that can be expected from a PSD comprising different cells.

The processing means also comprise:
calculation means 530. They are configured to determine the center frequency of channel. To do so, a simple formula is applied by them:
(Fdown+Fup)/2 if both are available
Fdown+1.92 MHz if only Fdown is available
Fup−1.92 MHz if only Fup is available.
comparison means 531. The comparison means are configured to compare the center frequency of each channel of a set of channels with the UARFCN. Precisely, during this comparison, the closest possible UARFCN and the center frequency of each channel are compared. Then, each center frequency of the channel is aligned with its closest UARFCN. As an example of implementation, the set of channels can comprise six channels. They are also configured to pre-select for each channel within the set of channels a certain number of UARFCN candidates. For example, nine UARFCNs are pre-selected, the closest to each center UARFCN.

In others words, means 529-531 are identification means for identifying all channel from said PSD.

All the physical layer means of device 523 are controlled by the control means 550.

According to an aspect of the invention, it is described a physical layer means based solution enabling a more accurate and faster solutions for essential step in the synchronization process of a mobile phone. This solution is easy to implement as a firmware in the base band processor.

The invention claimed is:

1. Method for identifying within an incident signal at least one frequency communication channel, said incident signal being received on a wireless apparatus, comprising determining a power spectral density (PSD) of that incident signal and identifying said at least one channel from said PSD,
wherein said step of identifying comprises performing a frequency derivative of said PSD and a recursive down-step and up-step detection of said derivative PSD to detect each channel corresponding to an up-step followed by a down-step, and
wherein said PSD determination comprises storing temporal samples of said incident signal received during a predetermined duration and performing a first Discrete Fourier Transform (DFT) processing on said stored samples.

2. Device for identifying within an incident signal at least one frequency communication channel, comprising reception means for receiving samples of the received signal, and processing means including:
means for determining a power spectral density (PSD) of that incident signal,
identification means for identifying said at least one channel from said PSD,
wherein the processing means further comprises:
storing means for storing temporal samples of said incident signal received during a predetermined duration,
a DFT module for a first Discrete Fourier Transform (DFT) processing, spectrum analyzing means including:
derivative means for determining the derivative frequency of said PSD, and
recursive up-step and down-step detection means for detecting each channel corresponding to an up-step followed by a down-step.

3. Wireless apparatus comprising a device according to claim 2.

* * * * *